United States Patent [19]

Yagi et al.

[11] Patent Number: 4,781,977
[45] Date of Patent: Nov. 1, 1988

[54] CYCLODEXTRIN ADSORBING-MATERIAL

[75] Inventors: Yoshiaki Yagi; Kenichi Yamamoto, both of Fujisawa; Yukio Tsuchiyama, Yokohama; Michikatsu Sato, Fujisawa; Kouki Fujii, Yokohama; Tomoyuki Ishikura, Chigasaki, all of Japan

[73] Assignee: Sanraku Incorporated, Tokyo, Japan

[21] Appl. No.: 925,264

[22] Filed: Oct. 31, 1986

[30] Foreign Application Priority Data

Oct. 31, 1985 [JP] Japan ................... 60-242956

[51] Int. Cl.$^4$ .................. C08B 37/16; B01J 20/32
[52] U.S. Cl. .................... 428/332; 428/403; 428/532; 536/103; 210/263
[58] Field of Search .............. 428/403, 532, 332; 536/103

[56] References Cited

U.S. PATENT DOCUMENTS

| 4,356,236 | 10/1982 | Koshugi | 428/403 |
| 4,384,898 | 5/1983 | Okada et al. | 435/96 |
| 4,575,519 | 3/1986 | Kifume et al. | 428/403 |

Primary Examiner—P. C. Ives
Attorney, Agent, or Firm—Wenderoth, Lind & Ponack

[57] ABSTRACT

A cyclodextrin adsorbing material composed of a water-insoluble resin substrate to which a ligand having such a size as to be included by cyclodextrin is chemically bonded via a spacer radical; a method of separating and purifying cyclodextrin from an aqueous solution containing it, which comprises bringing said aqueous solution into contact with the above adsorbing material to adsorb cyclodextrin on the adsorbing material, and subjecting the adsorbing material to a desorption treatment to recover cyclodextrin; and a method of increasing the amount of cyclodextrin yielded, which comprises carrying out a cyclodextrin-forming reaction by an enzymatic method in the presence of the above adsorbent material.

9 Claims, No Drawings

CYCLODEXTRIN ADSORBING-MATERIAL

This invention relates to an adsorbent material capable of adsorbing cyclodextrin thereon. More specifically, this invention relates to an adsorbent material capable of adsorbing cyclodextrin thereon with a high efficiency and a high selectivity from a solution containing cyclodextrin, for example, a reaction product mixture containing cyclodextrin as a main product, the unreacted material and various by-products, and to its use.

Cyclodextrin is usually produced by treating starch with cyclodextrin glycosyl transferase (CGTase). The resulting reaction mixture contains not only cyclodextrin as the final product but also the unreacted starch, various decomposition products such as oligodextrin and glucose, and the enzyme used. One method proposed for separating cyclodextrin from the reaction product mixture of cyclodextrin containing the unreacted material and by-products comprises adding an organic solvent capable of being included by cyclodextrin to the reaction mixture, and precipitating and separating cyclodextrin as a solid. The use of such an organic solvent, however, is undesirable for medicines and foods which are the main uses of cyclodextrin, and it has been desired to develop a separating method which does not involve the use of organic solvents.

In an attempt to separate or purify cyclodextrin without using an organic solvent, there have previously been proposed (1) a method which comprises adsorbing cyclodextrin on a porous styrene/divinylbenzene copolymer resin (Japanese Laid-Open Patent Publication No. 805/1981), (2) a method which comprises treating a mixture of cyclodextrin and reduced sugar with an anion exchange resin to adsorb the redued sugar alone on it, and separating cyclodextrin (Japanese Laid-Open Patent Publication No. 136,889/1976), (3) and a method which comprises treating a reaction product mixture containing cyclodextrin on a column packed with an alkali or alkaline earth metal salt of a strong acid-type cation exchange resin to fractionate it into a cyclodextrin fraction and a glucose fraction (Japanese Laid-Open Patent Publication No. 146,600/1982. However, the porous resin and ion exchange resins used in these prior methods have low selectivity, and in separating and recovering cyclodextrin adsorbed thereon, a complex elution treatment is required. Such methods are not entirely satisfactory for industrial operations.

The present inventors have made extensive investigations on an adsorbent material which has high selectivity and can permit separation of cyclodextrin by a simple eluting operation. These investigations have led to the present invention.

According to this invention, there is provided a cyclodextrin adsorbing material composed of a water-insoluble resin substrate to which a ligand having such a size as to be included by cyclodextrin is chemically bonded via a spacer radical.

The cyclodextrin adsorbent material will be described below in detail.

Ligand

The characteristic feature of this invention is that a resin substrate to which a ligand having such a size as to be included by cyclodextrin is chemically bonded via a spacer radical is used as an adsorbent material for cyclodextrin in place of conventional porous resins or ion exchange resins.

The ligand used in the adsorbent material of this invention is an atomic grouping which enters a ring-like cavity in cyclodextrin and is adsorbed onto its inner surface by hydrophobic bonding; namely it has such a size as to be included by cyclodextrin. Generally, the ligand includes, for example, hydrophobic organic residues having a bulky molecular structure. The size of the ligand included by cyclodextrin is restricted by the diameter of the ring-like cavity of cyclodextrin. If the shape of the ligand is taken as an ellipse just surrounding the entire atomic grouping of the ligand, the suitable size of the ligand is such that the short diameter of the ellipse is within the range of about 4 to about 10 Å, preferably about 5 to about 7.5 Å.

Specific examples of the ligand that can be used in the adsorbent material of this invention include $C_2$–$C_7$, preferably $C_4$–$C_6$, branched aliphatic hydrocarbon groups such as t-butyl, 3,3-dimethylbutyl, 2,2-dimethylbutyl and 2,3-dimethylbutyl; $C_5$–$C_{34}$, preferably $C_6$–$C_{29}$, alicyclic hydrocarbon groups such as cyclohexyl, cyclohexenyl, adamantyl, norborneyl, a glycyrrhetinic acid residue, a camphor residue, a borneol residue, 3-dimethylcyclohexyl, 4-ethylcyclohexyl, an abietic acid residue, a hecogenin residue and a stevio residue; aromatic hydrocarbon groups such as phenyl, naphthyl, p-t-butylphenyl and phenanthryl; and heterocyclic groups such as furyl, a thiophene residue, tetrahydrofuryl and a tetrahydrothiophene residue. Of these, t-butyl, cyclohexyl, adamantyl, norbonyl, a glycyrrhetinic acid residue, an abietic acid residue and p-t-butylphenyl are preferred.

Water-insoluble resin substrate

Any resin which is substantially water-insoluble may be used as the resin substrate of the adsorbent material of this invention. Typical examples of the substrate resin are given below. It should be understood however that the substrate resin for the adsorbent material of this invention is not limited to these specific examples, and any resins may be used into which the ligands can be introduced via spacer radicals by methods to be described hereinafter. present specification and the appended claims, denotes a skeletal structure portion constituting the main portion of a resin, and when the resin has functional group-containing side chains for introduction of ligands, it denotes a portion of the resin resulting from removal of the side chains.

In the following, not only the resin substrate alone, but also resins resulting from introduction of function-group containing side chains for introduction of ligands will be illustrated.

(1) Polysaccharide compounds and derivative thereof

The polysaccharide compounds may, for example, include cellulose, dexran, agarose, chitin and chitosan. Derivatives of such polysaccharides include compounds obtained by introducing side chains containing functional groups such as an epoxy group, an activated carboxyl group, a haloacetyl group or a tertiary or quaternary ammonium salt group into the polysaccharide compounds by utilizing crosslinked products of the polysaccharide compounds or the hydroxyl groups present in the polysaccharide compounds [for the method of introducing such groups, see, for example, P. Cautrecasas, J. Biol. Chem., 245, 3059 (1970); P. Cautrecasas, I. Parikh, Biochemistry, 11: and L. Sundberg, J. Porath, J. Chromatgr., 90, 87 (1984)].

Such compounds are available, for example, from Pharmacia Fine Chemicals under the tradenames AH-Sepharose 4B, CH-Sepharose 4B, Epoxy-Activated Sepharose 6B, Diethylaminoethyl-Sephadex, Quaternary Aminoethyl-Sephadex and Sulfopropyl-Sephadex; and from Fuji Boseki Co., Ltd. under the tradenames Chitopearl and Chitobeads.

(2) Styrene resins

The styrene resins include, for example, homopolymers or copolymers comprising styrene or ring-substituted derivatives thereof (such as haloalkyl-substituted styrene, an aminoalkyl-substituted styrene, a quaternary aminoalkyl-substituted styrene and a carboxyalkyl-substituted styrene) as main structural units. Preferred are chloromethylated polystyrene, a styrene/divinylbenzene copolymer, and derivatives of this copolymer resulting from introduction of a side chain containing a functional group such as a chloromethyl, aminoalkyl, quaternary aminoalkyl or carboxyalkyl group into the benzene ring. Specific examples of such a resin include chloromethylated polystyrene, and resins commercially available from Mitsubishi Chemical Industry Co., Ltd. under the tradenames Diaion WA, Diaion PA, and Diaion WK.

(3) Polyacrylamide resins

The polyacrylamide resins include, for example, a homopolymer of acrylamide, copolymers composed mainly of acrylamide, and polymers resulting from introducing an aminoalkyl group, a quaternary aminoalkyl group, an aminophenyl group, a quaternary aminophenyl group, etc. into these polymers via the amide group therein. Specific examples are resins commercially available from Bio-Rad Co. under the tradenames Bio-Gel, and Enzacryl.

(4) Peptides

An example is p-amino-DL-phenylalanine-L-leucine.

(5) Other resins

Various (co)polymers containing, or having introduced thereinto, pendant side chains having a functional group to which the ligand can be chemically bonded by methods to be described hereinafter, for example, homopolymers of various monomers used for the production of known water-insoluble resins, or copolymers of suitable combinations of the monomers. Specific examples include polymers of dienes such as butadiene and isoprene; polymers of vinyl ethers such as chloromethyl vinyl ether and allyl glycidyl ether; polymers of acrylic acid or derivatives thereof such as acrylamide, acrylic esters, acrylonitrile and N-methylolacrylamide; polymers of methacrylic acid or derivatives thereof such as methacrylic esters, methacrylonitrile, glycidyl methacrylate, 2-hydroxyethyl methacrylate, 2-sulfoethyl methacrylate and 2-chloro(bromo)ethyl methacrylate; polymers of unsaturated carboxylic acids such as itaconic acid and crotonic acid; a polymer of phenol, tetraethylenepentamine or phenylenediamine with formaldehyde; and copolymers composed of two or more of the above-mentioned monomers. Copolymers obtained by polymerizing derivatives of these monomers obtained by bonding the aforesaid ligands to the monomers by any of bonding methods described below involving formation of covalent bonds may be used as the resin substrate of this invention without the need to bond the ligands. These polymers can be produced by polymerization methods known per se.

Among the resins exemplified above, the polysaccharide compounds or derivatives thereof (1) are preferred. Chitosan and its crosslinked product are especially preferred.

Production of the cyclodextrin adsorbent material in accordance with this invention The adsorbent material of this invention can be produced by introducing the aforesaid ligand into the water-insoluble resin substrate via a suitable spacer radical by methods to be described below.

(1) Method utilizing a covalent bond reaction

Reaction scheme A

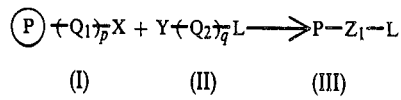

(I)    (II)    (III)

In the scheme:
$\textcircled{P}$ is the water-insoluble resin substrate,
L is the ligand,
X and Y are functional groups capable of being reacted with each other to form a covalent bonded,
$Z_1$ represents a spacer radical,
$Q_1$ constitutes part of the spacer radical $Z_1$ and represents part of a functional group-containing side chain possessed by, or introduced into, the water-insoluble resin resulting from removal of the functional group X therefrom,
$Q_2$ constitutes another part of the spacer radical $Z_1$ and represents a divalent residue linking the ligand L and the functional group Y, and
p and q are each 0 or 1.

Table 1 below shows examples of the functional groups X and Y and the type of reaction in covalent bonding.

TABLE 1

| X | Y | Type of the reaction | Covalent bond portion |
|---|---|---|---|
| —NH$_2$ | —COOH or its reactive derivative | amidation | —NHCO— |
| —COOH or its reactive derivative | —NH$_2$ | amidation | —CONH— |
| —OH | —COOH or its reactive derivative | esterification | —OCO— |
| —COOH or its reactive derivative | —OH | esterification | —COO— |
| —OH | —OH | etherification | —O— |
| —OH | $\diagdown$CH—halogen$\diagup$ | etherification | —OCH$\diagup\diagdown$ |

TABLE 1-continued

| X | Y | Type of the reaction | Covalent bond portion |
|---|---|---|---|
| \>CH—halogen | —OH | etherification | \>CHO— |
| \>CH—halogen | \>NH | N—alkylation | \>CH—N\< |
| \>NH | \>CH—halogen | N—alkylation | \>N—CH\< |
| \>NH | CH$_2$=CHCO— | N—alkylation | \>N—CH$_2$—CH$_2$CO— |
| —COCH=CH$_2$ | \>NH | N—alkylation | —COCH$_2$CH$_2$—N\< |
| —NCO | —OH | urethanization | —NHCOO— |
| —OH | —NCO | urethanization | —OCONH— |
| —NH$_2$ | —NCS | thiosemicarbazidation | —NHC(=S)—NH— |

In Table 1, Examples of the reactive derivatives of the carboxyl group (—COOH) include carboxylic acid halids (e.g., —COCl, —COBr), a carboxylic acid anhydride or mixed anhydride, and active carboxylate esters (e.g.,

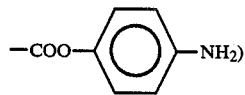

(the same examples are given with regard to Table 2 below).

Examples of the starting materials of formulae (I) and (II) used in reaction scheme A and the adsorbent resin of formula (III) are given below.

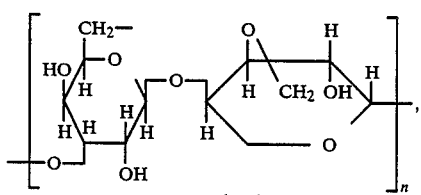

$n = 10^6-10^9$ or

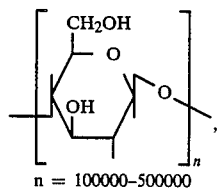

$n = 100000-500000$ or

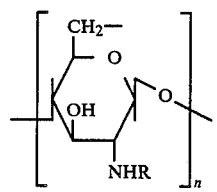

wherein R represents a hydrogen atom or an acetyl group, and n=100,000 to 500,000. or

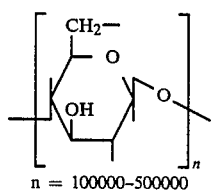

$n = 100000-500000$

TABLE 2

| No. | ‒(Q₁)ₚ‒ | X | Y | ‒(Q₂)ₑ‒ | L | Z₁ |
|---|---|---|---|---|---|---|
| 1 | ‒NH‒(CH₂)₆‒ | NH₂ | COOH or its reactive derivative | — | cyclohexyl | ‒NH‒(CH₂)₅NHCO‒ |
| 2 | " | " | COOH or its reactive derivative | CH₂CH₂NHCOCH₂CH₂ | cyclohexyl | ‒NH(CH₂)₆NHCO  NHCOCH₂CH₂‒ |
| 3 | " | " | COOH or its reactive derivative | CH₂CH₂ | 1,1-dimethylcyclohexyl (CH₃, CH₃) | ‒NH(CH₂)₆NHCOCH₂CH₂‒ |
| 4 | " | " | COOH or its reactive derivative | CH₂CH₂O | ethylcyclohexyl (CH₂CH₃) | ‒NH(CH₂)₆NHCO  O‒ |
| 5 | " | " | COOH or its reactive derivative | CH₂ | ‒C(CH₃)₃ | ‒NH(CH₂)₆NHCOCH₂‒ |
| 6 | " | " | COOH or its reactive derivative | CH₂CH₂OCH₂ | adamantyl | ‒NH(CH₂)₆NHCO  OCH₂‒ |
| 7 | " | " | COOH or its reactive derivative | CH₂CH₂NHCOCH₂ | methyladamantyl (CH₃) | ‒NH(CH₂)₆NHCO  NHOCH₂‒ |
| 8 | " | " | COOH or its reactive derivative | CH₂ | norbornyl | ‒NH(CH₂)₆NHCOCH₂‒ |

TABLE 2-continued

| No. | $(Q_1)_{\overline{p}}$ | X | Y | $(Q_2)_{\overline{q}}$ | L | $Z_1$ |
|---|---|---|---|---|---|---|
| 9 | " | " | COOH or its reactive derivative | CH$_2$NHCOCH$_2$NHCO | 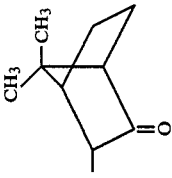 | —NH(CH$_2$)$_6$NHCOCH$_2$NHCOCH$_2$NHCO— |
| 10 | " | " | COOH or its reactive derivative | CH$_2$CH$_2$NHCO | 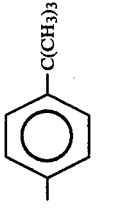 | —NH(CH$_2$)$_6$NHCO— |
| 11 | " | " | COOH or its reactive derivative | — |  | —NH(CH$_2$)$_6$NHCO— |
| 12 | " | " | COOH or its reactive derivative | CH$_2$CH$_2$NHCOCH$_2$ | 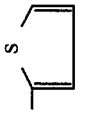 | —NH(CH$_2$)$_6$ NHCOCH$_2$— |
| 13 | " | " | COOH or its reactive derivative | — | | —NH(CH$_2$)$_6$NHCO— |
| 14 | " | " | COOH or its reactive derivative | — | 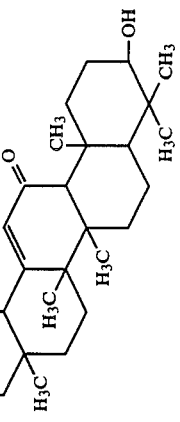 | —NH(CH$_2$)$_6$NHCO— |

TABLE 2-continued

| No. | $-(Q_1)_{\overline{7}}$ | X | Y | $-(Q_2)_{\overline{7}}$ | L | $Z_1$ |
|---|---|---|---|---|---|---|
| 15 | " | " | COOH or its reactive derivative | $CH_2CH_2OCH_2$ | 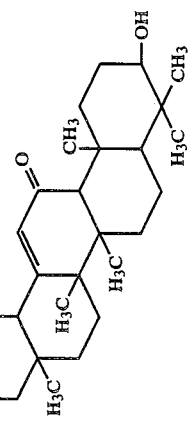 | $-NH(CH_2)_6NHCO\quad OCH_2-$ |
| 16 | " | " | COOH or its reactive derivative | $CH_2OCH_2$ | 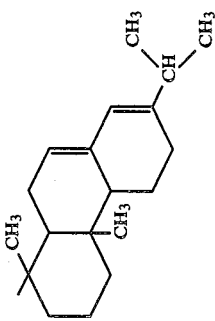 | $-NH(CH_2)_6NHCOCH_2OCH_2-$ |
| 17 | " | " | COOH or its reactive derivative | $CH_2$ | 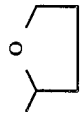 | $-NH(CH_2)_6NHCOCH_2-$ |
| 18 | " | " | COOH or its reactive derivative | $CH_2$ | 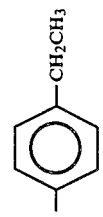 | $-NH(CH_2)_6NHCOCH_2-$ |
| 19 | $-NH(CH_2)_5-$ | COOH or its reactive derivative | $NH_2$ | $CH_2$ | 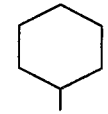 | $-NH(CH_2)_5CONHCH_2-$ |
| 20 | " | COOH or its reactive derivative | " | $CH_2CH_2CONHCH_2CH_2-$ | 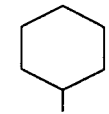 | $-NH(CH_2)_5CONH\quad CONHCH_2CH_2-$ |

TABLE 2-continued

| No. | $\text{+Q}_1\text{+}_p$ | X | Y | $\text{+Q}_2\text{+}_q$ | L | $Z_1$ |
|---|---|---|---|---|---|---|
| 21 | " | COOH or its reactive derivative | " | $CH_2CH_2$ | 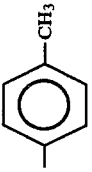 | $-NH(CH_2)_5CONHCH_2CH_2-$ |
| 22 | " | COOH or its reactive derivative | " | $CH_2CH_2O-$ | | $-NH(CH_2)_5CONHCH_2CH_2O-$ |
| 23 | " | COOH or its reactive derivative | " | $CH_2$ | $-C(CH_3)_3$ | $-NH(CH_2)_5CONHCH_2-$ |
| 24 | " | COOH or its reactive derivative | " | $CH_2$ |  | $-NH(CH_2)_5CONHCH_2-$ |
| 25 | " | COOH or its reactive derivative | " | $CH_2CH_2CONH$ | 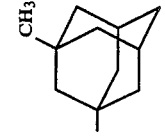 | $-NH(CH_2)_5CONHCH_2CH_2CONH-$ |
| 26 | $-NH(CH_2)_6-$ | COOH or its reactive derivative | " | $CH_2CH_2NHCOCH_2$ |  | $-NH(CH_2)_6CONHCH_2CH_2NHCOCH_2-$ |
| 27 | " | COOH or its reactive derivative | " | — |  | $-NH(CH_2)_6CONH-$ |
| 28 | " | COOH or its reactive derivative | " | $CH_2CH_2COCH_2$ | | $-NH(CH_2)_6CONHCH_2CH_2COCH_2-$ |

TABLE 2-continued

| No. | $(Q_1)_p$ | X | Y | $(Q_2)_q$ | L | $Z_1$ |
|---|---|---|---|---|---|---|
| 29 | " | COOH or its reactive derivative | " | CH₂CH₂NHCO | (bicyclic ketone structure) | —NH(CH₂)₆CONHCH₂CH₂NHCO— |
| 30 | " | COOH or its reactive derivative | " | CH₂CH₂NHCO | para-C(CH₃)₃-phenyl | —NH(CH₂)₆CONH NHCO— |
| 31 | " | COOH or its reactive derivative | " | CH₂ | naphthyl | —NH(CH₂)₆CONHCH₂— |
| 32 | — | NH₂ | COOH or its reactive derivative | CH₂CH₂ | cyclohexyl | —NHCOCH₂CH₂— |
| 33 | " | " | COOH or its reactive derivative | — | para-C(CH₃)₃-phenyl | —NHCO— |
| 34 | —NHCOCH₂CH₂— | " | COOH or its reactive derivative | CH₂CH₂ | cyclohexyl | (NHCOCH₂CH₂)₂— |
| 35 | " | " | COOH or its reactive derivative | — | para-C(CH₃)₃-phenyl | —NHCOCH₂CH₂NHCO— |
| 36 | " | " | COOH or its reactive derivative | CH₂CH₂NHCOCH₂CH₂ | (bicyclic structure) | (NHCOCH₂CH₂)₂NHCOCH₂— |

TABLE 2-continued

| No. | $-(Q_1)_p-$ | X | Y | $-(Q_2)_q-$ | L | $Z_1$ |
|---|---|---|---|---|---|---|
| 37 | $-(NHCOCH_2CH_2)-$ | " | COOH or its reactive derivative | $CH_2CH_2$ | cyclohexyl | $-(NHCOCH_2CH_2)-$ |
| 38 | " | " | COOH or its reactive derivative | — | $C_6H_4-C(CH_3)_3$ | $-(NHCOCH_2CH_2)_2NHCO-$ |
| 39 | $-(NHCOCH_2CH_2)-$ | " | COOH or its reactive derivative | $CH_2CH_2NHCOCH_2CH_2$ | norbornyl | $-(NHCOCH_2CH_2)_3NHCOCH_2-$ |
| 40 | $-NHCOCH_2CH_2-$ | " | COOH or its reactive derivative | $CH_2CH_2OCH_2$ | triterpene structure (with OH, CH₃ groups) | $-(NHCOCH_2CH_2)_2OCH_2-$ |
| 41 | " | " | COOH or its reactive derivative | — | diterpene structure (with CH(CH₃)₂ group) | " |
| 42 | — | " | epoxide (O with triangle) | $CH_2OCH_2CH_2NHCO$ | $C_6H_4-C(CH_3)_3$ | $-NHCH_2CH(OH)CH_2OCH_2OHNHCO-$ |

TABLE 2-continued

| No. | $(Q_1)_{\overline{p}}$ | X | Y | $(Q_2)_{\overline{q}}$ | L | $Z_1$ |
|---|---|---|---|---|---|---|
| 43 | — | " | O (epoxide) | CH$_2$OCH$_2$CH$_2$NHCOCH$_2$CH$_2$ | cyclohexyl | —NHCH$_2$CH(OH)CH$_2$OCH$_2$CH$_2$NHCOCH$_2$CH$_2$— |
| 44 | — | OH | " | " | " | —O—CH$_2$CH(OH)CH$_2$OCH$_2$CH$_2$NHCOCH$_2$CH$_2$— |
| 45 | — | " | " | CH$_2$OCH$_2$CH$_2$NHCO | 4-C(CH$_3$)$_3$-phenyl | —OCH$_2$CH(OH)CH$_2$OCH$_2$CH$_2$NHCO— |

(ii)

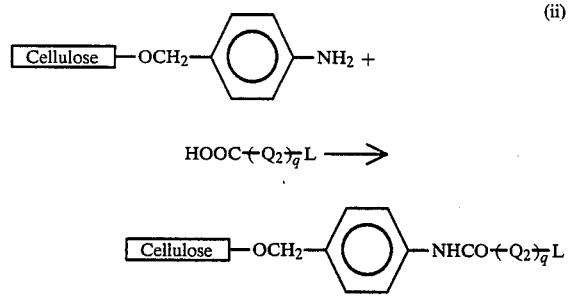

In the formula,

represents a water-insoluble resin substrate in which the hydroxyl groups in the basic skeleton of cellulose are partially omitted. $-Q_2)_q$ and L are the same as $-Q_2)_q$ and L in Nos. 1 to 18 and 33 to 41 in Table 2. The radical

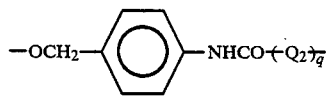

corresponds to the spacer radical.

(iii)

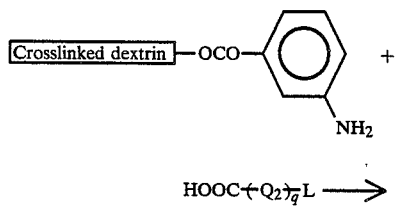

In the formula, crosslinked dextrin represents a water-insoluble resin substrate in which the hydroxyl groups in the basic skeleton of crosslinked dextrin are partially omitted.

$+Q_2)_q$ and L are the same as $+Q_2)_q$ and L in Nos. 1 to 18 and Nos. 33 to 41 in Table 1, and the radical

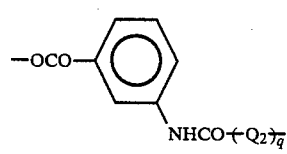

corresponds to the spacer radical.

(iv) Styrene resin

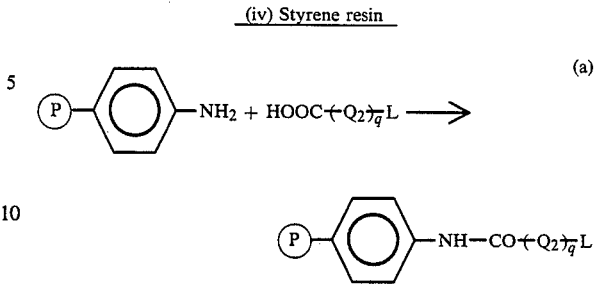
(a)

In the formula, (P) represents a styrene resin substrate represented by the general formula

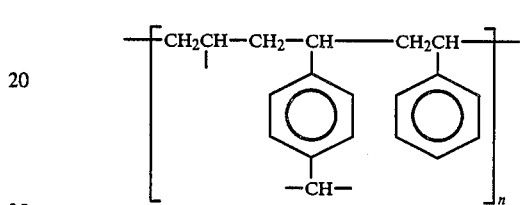

In the above formula, $+Q_2)_q$ and L are the same as $+Q_2)_q$ and L in Nos. 1 to 18 and 33 to 41 in Table 2, and the radical

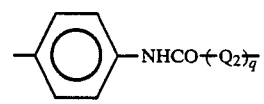

corresponds to the spacer radical.

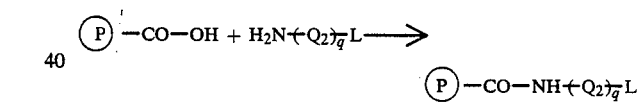

In the formula, (P) represents a styrene resin substrate represented by the general formula

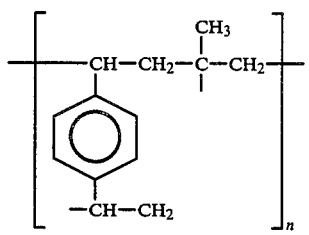

Here, $+Q_2)_q$ and L are the same as $+Q_2)_q$ and L in Nos. 19 to 31 in Table 2, and $-CONH+Q_2)_q$ corresponds to the spacer radical.

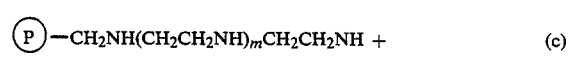
(c)

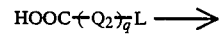

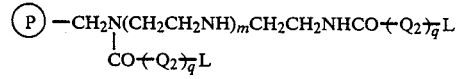

In the formula, (P) represents a styrene resin substrate represented by the general formula

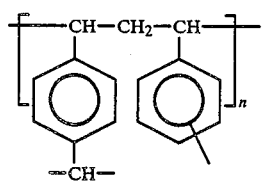

$+Q_2)_q$ and L are the same as $+Q_2)_q$ and L in Nos. 1 to 18 and 33 to 41 in Table 2, and $-CH_2N(CH_2CH_2NH)_mCH_2CH_2NHCO+Q_2)_q$ corresponds to the $CO+Q_2)_q$ spacer radical.

(v) Acrylic resin

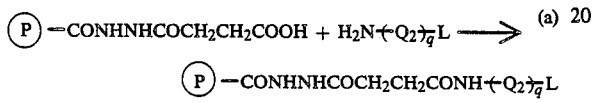

In the formula, (P) represents an acrylic resin substrate represented by the general formula

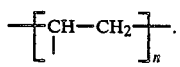

In the formula, $+Q_2)_q$ and L are the same as $+Q_2)_q$ and L in Nos. 19 to 31 in Table 2, and the radical $-CONHNHCOCH_2CH_2CONH+Q_2)_q$ corresponds to the spacer group.

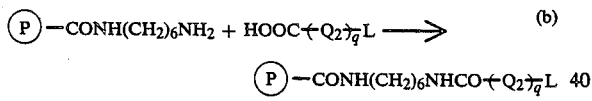

In the formula, (P) represents an acrylic resin substrate represented by the general formula

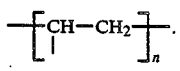

In the formula, $+Q_2)_q$ and L are the same as $+Q_2)_q$ and L in Nos. 1 to 18 and 33 to 41 in Table 2, and the radical $-CONH(CH_2)_6NHCO+Q_2)_q$ corresponds to the spacer radical.

(vi) Polyamino acid-type resin

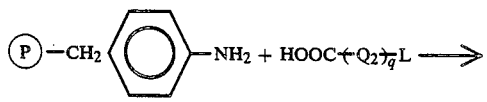

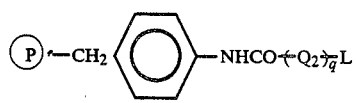

In the formula, (P) represents a polyamino acid type resin substrate represented by the general formula

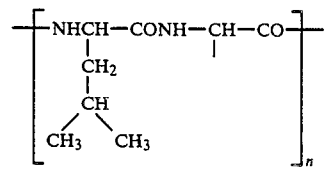

In the formula, $+Q_2)_q$ and L are the same as $+Q_2)_q$ and L in Nos. 1 to 18 and 33 to 41 in Table 2, and

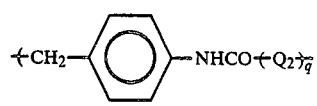

corresponds to the spacer radical.

(2) Method utilizing an ion bonding reaction

Reaction scheme B

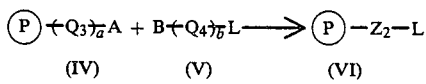

In the formula:
(P) and L are as defined above,
A and B are functional groups which can be reacted with each other to form an ionic bond,
$Z_2$ represents the spacer radical,
$Q_3$ constitutes part of the spacer radical $Z_2$ and represents a part resulting from removal of the functional group A from a functional group-containing side chain possessed by, or introduced into, the water-insoluble resin,
$Q_4$ forms another part of the spacer group $Z_2$ and represents a divalent residue linking the ligand L and the functional group B, and
a and b are each 0 or 1.

Specific examples of the reaction scheme B are shown below.

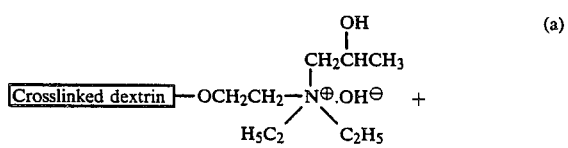

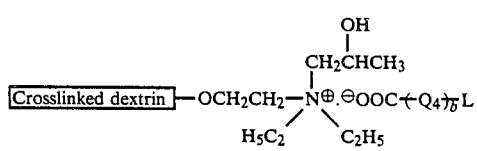

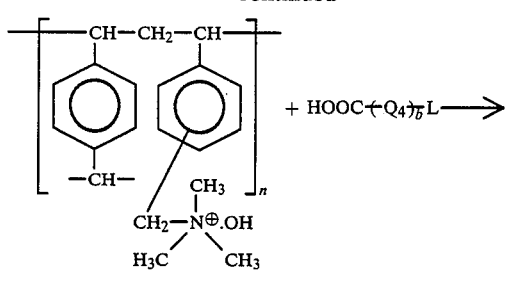
+ HOOC$(Q_4)_b$L ⟶
(b)
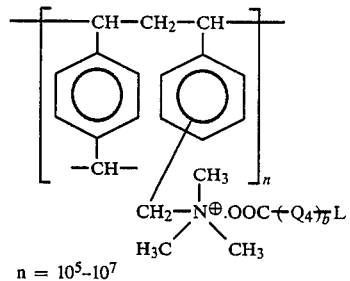
$n = 10^5 - 10^7$
In the schemes (a) and (b), specific examples of $(Q_4)_b$ are given below.
TABLE 3
| No. | $(Q_4)_b$ | L |
|---|---|---|
| 46 | — | cyclohexyl |
| 47 | CH₂CH₂NHCOCH₂CH₂— | cyclohexyl |
| 48 | CH₂ | 3,3-dimethylcyclohexyl |
| 49 | CH₂CH₂O— | 4-ethylcyclohexyl |
| 50 | CH₂ | —C(CH₃)₃ |
| 51 | CH₂CH₂OCH₂ | adamantyl |
| 52 | CH₂CH₂NHCOCH₂ | methyladamantyl |
| 53 | CH₂ | bicyclic |
| 54 | CH₂NHCOCH₂NHCO | dimethyl bicyclic ketone |

TABLE 3-continued

| No. | ${-(Q_4)_b}$ | L |
|---|---|---|
| 55 | $CH_2CH_2NHCOCH_2$ |  |
| 56 | $CH_2CH_2NHCO$ | 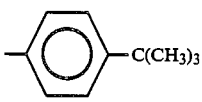 |
| 57 | — | 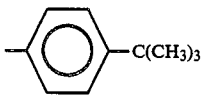 |
| 58 | $CH_2CH_2NHCOCH_2$ | 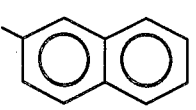 |
| 59 | — |  |
| 60 | — | 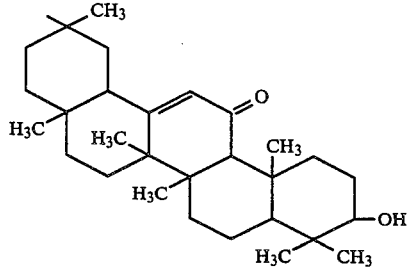 |
| 61 | $CH_2NHCOCH_2NHCO—$ | 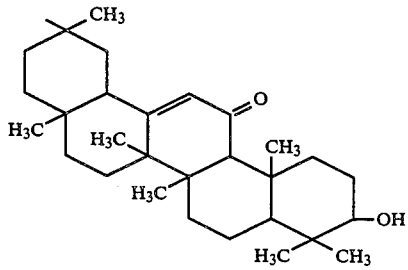 |
| 62 | — | 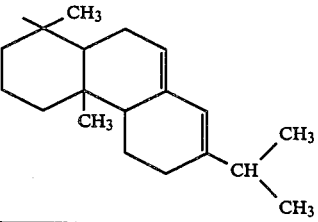 |

In the production of the adsorbent material of this invention utilizing the covalent bonding or ionic bonding reaction in (1) and (2) above, the reaction of the water-insoluble resin component of formula (I) or (IV) with the ligand introducing component of formula (II) or (V) can be carried out by methods known per se, for example by the methods described in K. Mosbach, ed., "Methods in Enzymology", vol. 44, Academic Press, New York (1976), and R. Axen, S. Ernback, Eur. J. Biochem., 18, 351 (1971). These references are cited herein instead of giving a detailed description of these methods. The spacer radical interposed between the ligand and the resin substrate in the adsorbent resin of this invention serves to prevent the resin substrate from becoming a steric hindrance when cyclodextrin approaches the adsorbent resin and includes the ligand. For this purpose, the spacer radical desirably has a length sufficient to space the ligand from the resin substrate (support) by a distance above a certain value. Its length varies depending upon the type of the substrate resin and/or the ligand and cannot be definitely specified. Generally, the spacer radical may be selected such that the total length of the spacer radical and the ligand is at least 10 angstroms, preferably 10 to 60 angstroms, more preferably 15 to 30 angstroms.

The total length of the spacer radical and the ligand is calculated by a CPK (Corey-Pauling Koltun) molecule model (a product of Ealing Company, U.S.A.).

The adsorbent resin provided by this invention may be molded into any desired shape suitable the intended uses to be described below. Preferably, it is, for example, in the form of beads, fibers, hollow fibers, cylinders, prisms, films, etc. Especially preferably, it is in the form of beads.

The following Examples illustrate the production of the adsorbent material of this invention more specifically.

EXAMPLE 1

Twenty milliliters of dry Diaion WA-20 (OH form) resin was immersed for 1 hour in dry chloroform, and then 10.6 ml (77.4 millimoles) of triethylamine and a solution of 16.2 g (54.1 millimoles) of 4'-nitrobenzene 4-t-butylbenzoate in 50 ml of dry chloroform were added. The mixture was reacted under reflux for 6 hours. The resin is then collected by filtration, and washed with a 50% (V/V) aqueous solution of ethanol containing 2% (W/V) of sodium hydroxide to remove p-nitrophenol. The resin was further washed with water and dried to give an adsorbent resin in which p-t-butyl-benzoic acid was bonded to the ethyleneamine side chain of WA-20 resin by an amide linkage via the carboxyl group of the benzoic acid.

EXAMPLE 2

The same treatment as in Example 1 was carried out using an active ester of p-nitrophenol with 3-methyl-1-adamantaneacetic acid and 2-norborneneacetic acid to prepare an adsorbent resin having the corresponding ligand.

EXAMPLE 3

Glycyrrhitinic acid (7.9 g; 16.8 millimoles) was dissolved in 200 ml of dry N,N-dimethylformamide. A solution of 7.0 g (33.9 millimoles) of dicyclohexylcarbodiimide in 100 ml of dry DMF was added, and the mixture was stirred at room temperature for 3 hours. Twenty milliliters of dry Diaion WA-20 (OH form) resin was added, and the entire mixture was stirred at room temperature for 24 hours.

After the reaction, the resin was collected by filtration, washed fully to remove dicyclohexylurea, further washed with water, and dried to give an adsorbent resin in which glycyrrhitinic acid was bonded to the ethyleneamine side chain of the WA-20 resin by an amide linkage via the carboxylic group f the acid.

EXAMPLE 4

Dry tetrahydrofuran (30 ml) and 20 ml (0.14 mole) of triethylamine were added to 20 ml of dry Diaion WA-20 (OH form) resin. A solution of 17 ml (0.127 mole) of cyclohexylcarbonyl chloride in 20 ml of tetrahydrofuran was added dropwise under ice cooling in an atmosphere of nitrogen. After the addition, the reaction temperature was raised to room temperature, and the reaction mixture was stirred overnight. The resin was collected by filtration and washed with tetrahydrofuran to remove an excess of the reagent. Furthermore, the resin was washed with water and dried to give an adsorbent resin in which the cyclohexyl carbonyl group was bonded to the ethyleneamine side chain of the WA-20 resin by an amide linkage.

EXAMPLE 5

The same treatment as in Example 4 was carried out by using myristyl chloride or cyclohexylpropionyl chloride instead of cyclohexylcarbonyl chloride. An adsorbent resin in which the myristyl group or the cyclohexylpropionyl group was bonded to the WA-20 resin was obtained.

EXAMPLE 6

Swollen activated CH Sepharose 4B (30 ml) and 100 ml of 0.1M carbonate buffer (pH 8.0) were mixed, and 2.26 g (2.0 millimoles) of cyclohexylmethylamine was added. The mixture was reacted at room temperature for 1 hour. The resin was separated by filtration, and washed alternately with 100 ml each of 0.05M Tris buffer and 0.05M formate buffer (pH 4.0) to remove the excess of cyclohexylmethylamine. The resin was further washed with water and dried to give an adsorbent resin in which cyclohexylmethylamine was bonded through an amide linkage to the carboxyl groups of CH-Sepharose 4B.

In the same way as above, the activated CH Sepharose 4B was reacted respectively with 1-adamantyloxyethylamine and 4-t-butylphenylamine as amine derivatives of ligands to produce agarose-type adsorbent resins having the corresponding ligands.

It was determined by IR that the resins obtained above had an adsorption near 1630 $cm^{-1}$ based on the carbonyl group of the amide.

EXAMPLE 7

DMA (15 ml) was added to 20 ml of dry chitosan resin (Chitopearl BCW1010, a product of Fuji Boseki Co., Ltd.) which had been fully swollen in N,N-dimethylacetamide (to be referred to as DMA). Then, a solution of 2.20 millimoles of a mixed acid anhydride of (N-3-cyclohexylpropionyl-beta-alanyl)-beta-alanine and pivalic acid in 5 ml of DNA was added, and the mixture was stirred at room temperature for 24 hours. The resin was collected by filtration and washed with 40 ml of acetone three times. The resin was further washed with 250 ml of a dilute alkaline 50% methanol-water and then with 250 ml of water to give a substituted chitosan resin in which (N-3-cyclohexylpropionyl-beta-alanyl)-beta-alanine was introduced into the amino groups of the chitosan resin through an acid amide linkage.

EXAMPLE 8

The same treatment as in Example 7 was carried out using compounds resulting from bonding of 0 to 3 beta-alanine moieties in a chain-like fashion to cyclohexanepropionic acid through an acid amide linkage, for example cyclohexanepropionic acid or (N-3-cyclohexylpropionyl-beta-alanyl)-beta-alanyl-beta-alanine, or compounds resulting from bonding of 0 to 4 beta-alanine moieties in a chain-like fashion to t-butylbenzoic acid, for example (N-4-t-butylbenzoyl-beta-alanyl)-beta-alanyl-beta-alanyl-beta-alanine, or (N-2-norbornaneacetyl-beta-alanyl)-beta-alanine instead of the (N-3-cyclohexylpropionyl-beta-alanyl)-beta-alanine used in Example 7. Substituted chitosan resins having the corresponding ligands were prepared. It was determined by IR that these resins had an absorption based on the carbonyl of the amide near 1650 and 1550 cm$^{-1}$.

EXAMPLE 9

PA-308 resin (35 ml) converted into the OH form by using a 4% (W/V) aqueous solution of sodium hydroxide was packed into a column (15 mm), and washed fully with water and then with a 50% (V/V) aqueous solution of ethanol.

9.0 g (50.5 mmoles) of p-t-butylbenzoic acid was dissolved in a 50% (V/V) aqueous solution of ethanol containing 3.0 ml of a 40% (V/V) aqueous solution of methylamine. The solution was passed through the column of PA-308 (OH form) at a velocity (S.V.) of about 65 ml/hr. The column was further washed with about 500 ml of a 50% (V/V) aqueous solution of ethanol and then with water, and dried to give an adsorbent resin in which p-t-butylbenzoic acid was ionically bonded to the PA-308 resin.

EXAMPLE 10

The same treatment as in Example 9 was carried out using t-butylacetic acid, cyclohexylpropionic acid, glycyrrhitinic acid, damantylacetic acid and norbornenacetic acid instead of p-t-butylbenzoic acid. Adsorbent resins having the corresponding ligands were obtained.

EXAMPLE 11

QAE A-25 resin (12.5 ml) which had been converted to the OH form by treatment with a 1% (W/V) aqueous solution of sodium hydroxide was packed into a column having a diameter of 15 mm, and washed with water fully and then with a 50% (V/V) aqueous solution of ethanol.

5.0 ml (34.5 millimoles) of 2-norbornaneacetic acid was dissolved in 125 ml of a 32% (V/V) aqueous solution of ethanol containing 1.0 ml of a 40% (V/V) aqueous solution of methylamine, and the solution was passed through the column of QAE A-25 (OH form) resin at a flow velocity (S.V.) of about 65 ml/hr.

The column was then further washed with about 300 ml of a 50% (V/V) aqueous solution of ethanol, and then with water, and dried to give an adsorbent resin in which 2-norbornaneacetic acid was ionically bonded to the anion exchange part of QAE A-25 resin.

EXAMPLE 12

Example 11 was repeated except that 3-methyl-1-adamantaneacetic acid, abietic acid, myristic acid and cyclohexanepropionic acid were used respectively instead of 2-norbornene acetic acid. Adsorbent resins having the corresponding ligands ionically bonded to QAE A-25 resin were obtained.

Cyclodextrin adsorbing property of the adsorbent resin of this invention

Tables 4 to 11 below show the cyclodextrin (to be abbreviated as "CD") adsorbing properties of the adsorbent resins of this invention. The adsorption test was carried out as follows: 35 ml of each of the CD adsorbent resins indicated in these tables was packed into a column (1.5 cm × 25 cm) and fully washed with water, and then 45 ml of a CD-containing solution [α-CD, 1 (W/V) %; β-CD, 1 (W/V) %; γ-CD, 1 (W/V) % aqueous solutions] was passed through the column. The column was then washed with water by passing it in an amount of 350 ml and then 180 ml of a 1:1 mixture of ethanol and water was passed through the column. The CD content of each of he solutions that passed through the column was measured by the HPLC method [Shodex, RS-pak DC-613 column; CH$_2$CN/H$_2$O (65/35), 15 ml/min.]. The amount of CD measured was calculated for the amount (g) of CD adsorbed on each 1 liter of the resin, and the results are shown in Tables 5 to 9.

TABLE 4

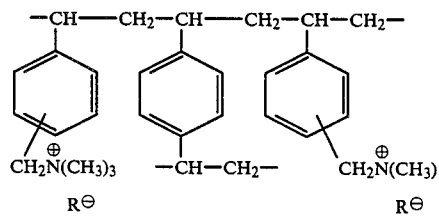

| CD adsorbent R⁻ | Amount of CD adsorbed (g/l-resin) | | | |
|---|---|---|---|---|
| | α-CD | β-CD | γ-CD | total |
| CH$_3$(CH$_2$)$_6$COO⁻ | 21.4 | 9.9 | 0 | 31.3 |
| CH$_3$(CH$_2$)$_{12}$COO⁻ | 18.1 | 2.1 | 0 | 20.2 |
| (CH$_3$)$_3$CCH$_2$COO⁻ | 0 | 71.8 | 0 | 71.8 |
| ⟨cyclohexyl⟩-COO⁻ | 0 | 44.7 | 0 | 44.7 |
| ⟨cyclohexyl⟩-CH$_2$CH$_2$COO⁻ | 9.4 | 98.6 | 7.0 | 115.0 |

TABLE 4-continued

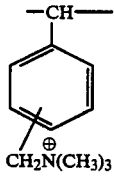

| CD adsorbent R⊖ | Amount of CD adsorbed (g/l-resin) | | | |
|---|---|---|---|---|
| | α-CD | β-CD | γ-CD | total |
| 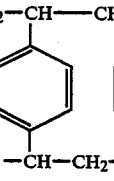 | 0 | 15.1 | 10.1 | 25.2 |
| glycyrrhitinic acid anion | 0 | 0 | 36.2 | 36.2 |
| glycyrrhetinic acid anion | 13.6 | 13.4 | 32.6 | 59.6 |
| 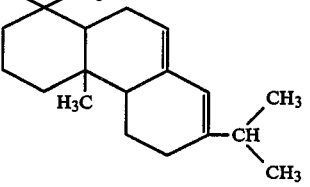 | 0 | 98.2 | 2.7 | 100.9 |
|  | 0 | 22.2 | 0 | 22.2 |
| 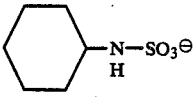 | 0 | 16.6 | 0 | 16.6 |

TABLE 5

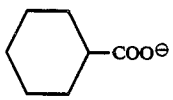

| CD adsorbent resin R⊖ | Amount of CD adsorbed (g/l-resin) | | | |
|---|---|---|---|---|
| | α-CD | β-CD | γ-CD | total |
| $CH_3(CH_2)_6COO^\ominus$ | 50.0 | 44.7 | 0 | 94.7 |
| $CH_3(CH_2)_{12}COO^\ominus$ | 40.8 | 0 | 0 | 40.8 |
| $(CH_3)_3CCH_2COO^\ominus$ | 0 | 35.7 | 0 | 35.7 |
| 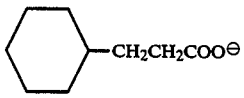 | 0 | 34.8 | 0 | 34.8 |
| 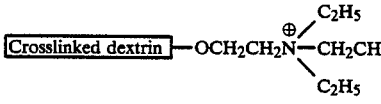 | 0 | 147.6 | 0 | 147.6 |

TABLE 5-continued

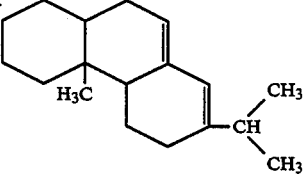

| CD adsorbent resin R⊖ | Amount of CD adsorbed (g/l-resin) | | | |
|---|---|---|---|---|
| | α-CD | β-CD | γ-CD | total |
| 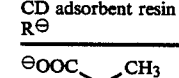 | 0 | 24.2 | 45.3 | 69.5 |
| glycyrrhitinic acid anion | 0 | 0 | 55.0 | 55.0 |
| 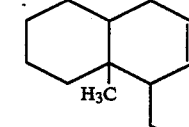 | 0 | 107.9 | 0 | 107.9 |

TABLE 5-continued

Crosslinked dextrin—OCH₂CH₂N⁺(C₂H₅)₂—CH₂CH(OH)CH₃·R⁻

| CD adsorbent resin R⁻ | Amount of CD adsorbed (g/l-resin) | | | |
|---|---|---|---|---|
| | α-CD | β-CD | γ-CD | total |
| cyclohexyl-NH-SO₃⁻ | 0 | 37.3 | 0 | 37.3 |
| camphorsulfonate (H₃C, CH₃ bicyclic ketone-CH₂SO₃⁻) | 0 | 32.2 | 0 | 32.2 |
| norbornyl-CH₂-COO⁻ | 0 | 160.1 | 0 | 160.1 |
| adamantyl(CH₃)-CH₂-COO⁻ | 0 | 171.2 | 11.1 | 182.3 |

TABLE 6

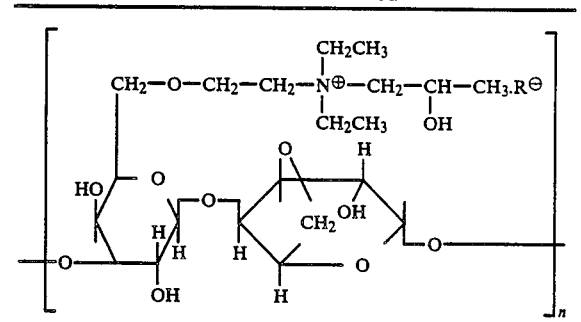

| CD adsorbent R⁻ | Amount of CD adsorbed (g/l-resin) | | | |
|---|---|---|---|---|
| | α-CD | β-CD | γ-CD | total |
| CH₃(CH₂)₆COO⁻ | 50.0 | 44.7 | 0 | 94.7 |
| CH₃(CH₂)₁₂COO⁻ | 40.8 | 0 | 0 | 40.8 |
| (CH₃)₃CCH₂COO⁻ | 0 | 35.7 | 0 | 35.7 |
| cyclohexyl-COO⁻ | 0 | 34.8 | 0 | 34.8 |
| cyclohexyl-CH₂CH₂COO⁻ | 0 | 147.6 | 0 | 147.6 |
| abietate (⁻OOC, CH₃ tricyclic structure) | 0 | 24.2 | 45.3 | 69.5 |

TABLE 6-continued

| CD adsorbent R⁻ | Amount of CD adsorbed (g/l-resin) | | | |
|---|---|---|---|---|
| | α-CD | β-CD | γ-CD | total |
| glycyrrhitinic acid anion | 0 | 0 | 55.0 | 55.0 |
| (CH₃)₃C-C₆H₄-COO⁻ | 0 | 107.9 | 0 | 107.9 |
| cyclohexyl-NH-SO₃⁻ | 0 | 37.3 | 0 | 37.3 |
| camphorsulfonate | 0 | 32.2 | 0 | 32.2 |
| norbornyl-CH₂-COO⁻ | 0 | 160.1 | 0 | 160.1 |
| adamantyl(CH₃)-CH₂-COO⁻ | 0 | 171.2 | 11.1 | 182.3 |

TABLE 7

—CH—CH₂—CH—
    |           |
  C₆H₄        C₆H₄
    |           |
  —CH—       CH₂N(CH₂CH₂N)ₘCH₂CH₂NHR
              |            |
              R            R

| CD adsorbent resin R | Amount of CD adsorbed (g/l-resin) | | | |
|---|---|---|---|---|
| | α-CD | β-CD | γ-CD | total |
| CH₃(CH₂)₁₂CO | 5.9 | 2.2 | 0 | 8.1 |
| cyclohexyl-CO | 0 | 2.1 | 0 | 2.1 |
| cyclohexyl-CH₂CH₂CO | 1.0 | 26.4 | 1.4 | 28.8 |
| glycyrrhitinic acid residue | 0 | 5.0 | 9.6 | 14.6 |

TABLE 7-continued
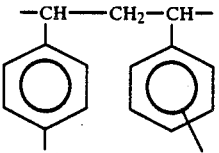
| CD adsorbent resin R | Amount of CD adsorbed (g/l-resin) | | | |
|---|---|---|---|---|
| | α-CD | β-CD | γ-CD | total |
| 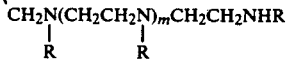 (CH₃)₃C—⟨ ⟩—CO | 0 | 28.9 | 5.0 | 33.9 |
| 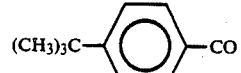 —CH₂CO | 0 | 35.0 | 4.3 | 39.3 |
|  CH₃, —CH₂CO (adamantyl) | 0 | 50.5 | 7.2 | 57.7 |
TABLE 8
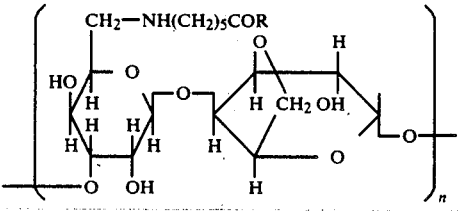
| CD adsorbent resin R | Amount of CD adsorbed (g/l-resin) | | | |
|---|---|---|---|---|
| | α-CD | β-CD | γ-CD | total |
| 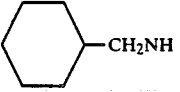 cyclohexyl-CH₂NH | 0 | 140.0 | 0 | 140.0 |
| 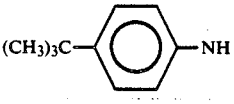 (CH₃)₃C—⟨ ⟩—NH | 0 | 110.9 | 0 | 110.9 |
| 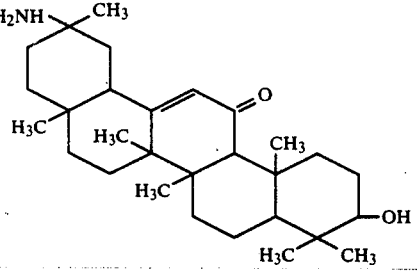 triterpene-CONHCH₂CH₂NH | 0 | 0 | 63.2 | 63.2 |
| 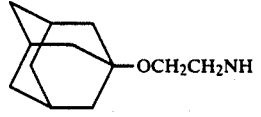 adamantyl-OCH₂CH₂NH | 0 | 165.3 | 28.7 | 194.0 |
| 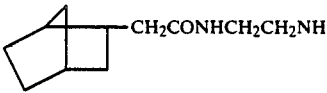 norbornyl-CH₂CONHCH₂CH₂NH | 0 | 155.8 | 0 | 155.8 |

TABLE 9

| CD adsorvent resin | | Amount of β-CD adsorbed |
|---|---|---|
| General formula | R | (g/l-resin) |
| ![chitosan unit] | ⬡—CONH—CONH—CO | 54.0 |
| | (bicyclic)—CONH—CONH—CO | 48.5 |
| | (CH$_3$)$_3$C—⬡—CONH—CONH—CO | 54.1 |

The amount of β-CD adsorbed on the adsorbent resin which corresponds to changes in the length of the spacer radical is shown in Table 10. The converted value of the amount of adsorption was calculated by the ame method as described hereinabove.

TABLE 10

| | | Amount of β-CD adsorbed (g/l-resin) | |
|---|---|---|---|
| | | R | |
| Adsorbent resin(*) General formula | n | ⬡—CO(NH CO)$_{\overline{n}}$ | (CH$_3$)$_3$C—⬡—CO(NH CO)$_{\overline{n}}$ |
| [chitosan] | 0 | 28.8 | 24.7 |
| | 1 | 41.1 | 45.7 |
| | 2 | 54.0 | 54.1 |
| | 3 | 45.0 | 53.1 |
| | 4 | — | 38.8 |

(*): The adsorbent resin was obtained by covalently bonding 0.3 equivalent of the group R to the amino group of Chitopearl BCW1010 (a product of Fuji Boseki Co., Ltd.).

In the production of a resin represented by the following general formula

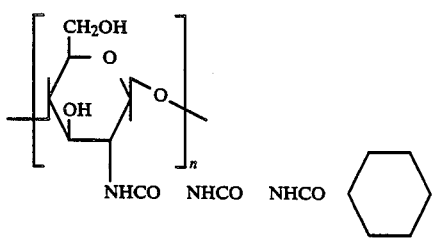

the correlation of the amount of pivalic anhydride represented by the following formula

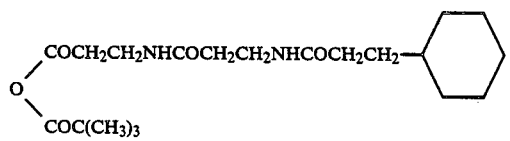

to the amount of adsorption of β-CD on the resin is shown in Table 11.

TABLE 11

| Amount of the acid anhydride charged | Amount of β-CD adsorbed | Ratio of swelling |
|---|---|---|
| (mole %) | (g/liter-resin) | (%) |
| 15 | 30.2 | 31 |
| 30 | 54.0 | 84 |
| 45 | 63.0 | 88 |
| 60 | 21.0 | 36 |

Uses of the adsorbent resin of this invention

Since the adsorbent resin of this invention has selective physical adsorbability with respect to its ligand and the hydrophobic cavity of cyclodextrin, it has the following specific uses.

(1) Selective separation and purification of cyclodextrin from an aqueous solution containing cyclodextrin:

The adsorbent resin of this invention can be used to separate and purify CD selectively from a reaction product mixture containing CD. As stated hereinabove, CD is produced by causing various kinds of CGTase to act on an aqueous solution or suspension of a starch and separating and purifying CD from the resulting reaction mixture containing α-, β- and/or γ-CD, the unreacted starch and by-products such as oligodextrins and glucose. Since the adsorbent resin of this invention can selectively adsorb CD, CD can be separated and purified in good yields by adsorbing CD on it by using it as a carrier in column chromatography or by contacting an aqueous solution containing CD such as the aforesaid reaction mixture with the adsorbent resin batchwise thereby to separate CD from the unreacted starch and the by-products, and then desorbing the adsorbed CD from the adsorbent resin using hot water or a mixed solvent of an alkanol and water.

Contacting of the adsorbent material with an aqueous solution containing cyclodextrin can generally be carried out at ordinary temperature. If desired, it may be carried out at an elevated temperature of, for example, about 30° to 70° C. The contact time is not strictly limited, and usually a period of 1 to 4 hours suffices.

The temperature of hot water used in desorbing cyclodextrin from the resin on which it is adsorbed may be within the range of about 70° to 90° C. The alkanol in the alkanol/water mixed solvent is a lower alkanol such as methanol, ethanol or propanol. The suitable mixing ratio of the alkanol to water is generally from 1:5 to 3:5 (V/V). Acetone, acetonitrile, tetrahydofuran and dioxane may also be used as the desorption solvent.

A reaction liquor in a chemical reaction catalyzed by CD, an enzymatic reaction liquor using CD as a protecting agent for the product as a microbial fermentation liquor may also be cited as examples of the aqueous solution containing cyclodextrion.

The following specific examples show the selective separation and purification of cyclodextrin.

EXAMPLE 13

Neospitase (a product of Nagase Industrial Co., Ltd.; 0.05 g) was added to 100 g of potato starch, and then water was added to adjust the total volume to 2 liters. The mixture was heated at 80° C. for 20 minutes and then autoclaves at 120° C. for 10 minutes. Then, the treated product was cooled to 50° C., and 1,000 units of CGTase obtained from *Bacillus ohbensis* (FERM P-1990) was added, and the reaction was carried out at 50° C. and a pH of 6.0 for 24 hours to form CD. The reaction mixture was heat-treated to 100° C. for 15 minutes, and then the enzyme was inactivated. Part of the reaction product was sampled, and the amount of CD formed was measured by liquid chromatography. It was found that 0.8% (wt/wt) of α-CD, 31.0% (wt/wt) of β-CD and 8.5% (wt/wt) of γ-CD were formed.

The reaction product mixture was passed by the descending method through a column packed with 700 ml of PA-308 having t-butylacetic acid ionically bonded to it. The column was washed with 3.0 liters of water. Five liters of a 50% (V/V) aqueous solution of ethanol was passed through the column, followed by concentration to dryness. There was obtained 320 g of β-CD having a purity of 95.3%.

The reaction mixture which was passed through the column and the washing liquids were combined and charged by the descending method onto a column packed with 500 ml of PA-308 having glycyrrhitin ionically bonded thereto, and the column was washed with 2.0 liters of water.

Four liters of hot water at 70° C. was passed through the column, followed by concentration to dryness. There was obtained 6.7 g of γ-CD having a purity of 98.0%.

EXAMPLE 14

425 ml of the same reaction mixture as treated in Example 13 (7.40 g of β-CD, 1.36 g of γ-CD) was passed by the descending method through a column packed with 100 ml of a chitosan resin having 44 mole% (based on the constituent glucosamine) of (N-3-cyclohexylpropionyl-beta-alanyl)-beta-alanine bonded thereto. The column was then washed with 400 ml of water, and the adsorbed CD was eluted by passing 755 ml of a 50% (V/V) aqueous solution of ethanol through the column. THe eluate was concentrated to give 5.87 g (recovery ratio 83.4%) of β-CD crystals having a purity of 99.9%.

(2) Increased production of a specific CD in the reaction of forming CDs

The CD-forming reaction is an enzymatic reaction with CGTase and proceeds reversibly. It is known that by carrying out the reaction in the presence of an organic solvent capable of being included in CD, the resulting CD can be removed from the reaction system as a precipitate and the ratio of conversion of the starting starch to CD can be increased (see, for example, Japanese Laid-Open Patent Publication No. 156398/1985).

Since the adsorbent resin of this invention has an organic residue as a ligand which can be included in CD, the aforesaid ratio of conversion can be increased by carrying out the reaction in the presence of the adsorbent resin in the reaction system, and at the same time, the ratio of formation of any desired one of α, β, and γ-CDs can be increased by selecting the ligand in the adsorbent resin. Since the resulting CD is selectively adsorbed on the adsorbent resin, CD of high purity can be easily obtained from the adsorbent resin by the CD desorption method described hereinabove.

The CD-forming reaction using the adsorbent resin of this invention can be carried out by using starting materials known per se under reaction conditions known per se except that the reaction is carried out in the presence of the adsorbent resin [see, for example, British Pat. No. 1,459,654, U.S. Pat. No. 4,317,881, and Agricultural and Biological Chemistry, 49, 1189-1191 (1985)]. For example, soluble starch is usually employed as a starting material, and by subjecting it to an enzymatic reaction with CGTase in an aqueous medium, CD is formed. CGTase may be any of those derived from *Bacillus macerans, Bacillus circulans, Bacillus megaterium, Bacillus ohbensis, Klebsiella pneumoniae, Alkalophilic bacillus, Micrococcus variens, Micrococcus luteus*, etc. The enzymatic reaction can be terminated in about 12 to 48 hours at a temperature of 30° to 65° C.

According to this invention, by performing the CD-forming reaction by this enzymatic method in the presence of the adsorbent resin, the amount of CD yielded can be increased by about 50 to 150% of that obtained in the prior art.

This reaction can be carried out, for example, by charging the adsorbent resins in the form of beads, etc. into a reactor for CD formation, and performing the enzymatic reaction batchwise or continuously while suspending the reaction system with stirring; or by passing an aqueous solution containing the starting material and CGTase once or several times through a reaction column packed with the adsorbent resin molded into a suitable shape such as beads.

One advantage of the CD-forming reaction in accordance with this invention is that it can be carried out by using the soluble starch in a higher concentration than in the prior art. In the general conventional CD-forming reaction, the concentration of the soluble starch is, for example, 5 to 7% (W/W). According to the method of this invention, the concentration of the starting starch can be increased to about 10 to about 20% (wt/wt) without substantially decreasing the efficiency of CD formation.

The concentration of the starch used in this invention in the aqueous solution is not particularly limited. It may be selected within the range of 3 to 20% (wt/wt), preferably within the range of 5 to 15%.

The optimum temperature for the reaction differs depending upon the type of the CGTase used, and is not critical. In the case of using CGTase obtained from *Bacillus ohbensis*, the reaction temperature may be 45° to 65° C., preferably 50° 1 to 60° C., and the pH of the reaction system can be set at 5 to 11, preferably 6.5 to 7.5.

The reaction time differs depending upon the mode of the reaction, and the type and amount of the CGTase used, and cannot be limited strictly. The reaction may be continued until the starch used as a substrate material is consumed almost completely.

The amount of the adsorbent resin of this invention used in this reaction, irrespective of the mode of the reaction, may be above the amount which can sufficiently adsorb CD thereon under the assumption that 100% of starch used as the substrate material is completely converted to CD. The amount of CD adsorbed to a particular adsorbent resin in accordance with this invention can be empirically determined by a routine experiment conducted on the resin.

According to the method of this invention described above, the resulting CD can be directly recovered from the reaction system in a form adsorbed on the adsorbent resin. Hence, the method of this invention does not require a complex separating and purifying operation for CD as in the prior art, and is very advantageous in industrial practice.

The following Examples illustrate the CD-forming reaction more specifically.

EXAMPLE 15

Ten grams of soluble starch was added to warm water to adjust the total volume to 500 ml, and the solution was autoclaved at 120° C. for 15 minutes. In this way, two reaction solutions were prepared.

The reaction solutions were cooled to 55° C. and 100 units of CGTase derived from *Bacillus ohbensis* was added to each of the solutions, and the CD-forming reaction was carried out at a pH of 7.0 for 19 hours. Three hours after the start of the reaction, 50 ml of PA-308 resin having p-t-butylbenzoic acid ionically adsorbed to it was added to one of the reaction solutions.

After performing the reaction for 19 hours, the amount of CD formed from each of the reaction solutions was determined by liquid chromatography. The resin was separated from the reaction solution obtained in the presence of it. The resin were thoroughly washed with water and eluted with a 50 (V/V) aqueous solution of ethanol to obtain a CD-containing eluate. The amounts of CD in the supernatant and in the eluate were individually determined by liquid chromatography. The results are shown in Table 12.

TABLE 12

| Resin not added Amount of CD (conversion based on the substrate) | | Resin added Amount of CD (conversion based on the substrate) | |
| --- | --- | --- | --- |
| α-CD | 0.0636 g | α-CD | 0.0594 g |

TABLE 12-continued

| Resin not added Amount of CD (conversion based on the substrate) | | Resin added Amount of CD (conversion based on the substrate) | |
| --- | --- | --- | --- |
| β-CD | 1.7466 g | β-CD | 3.0626 g |
| γ-CD | 0.3487 g | γ-CD | 0.1757 g |
| total | 2.1589 g (21.6%) | total | 3.2977 g (33.0%) |

EXAMPLE 16

Water was added to 5 g of potato starch and 3 mg of Neospitase (a product of Nagase Sangyo Co., Ltd.) to adjust the total volume to 50 ml. The mixture was liquefied at 30° C. for 20 minutes, and then autoclaved at 120° C. for 15 minutes. The reaction mixture was cooled to 50° C., and 3 g of sodium chloride, 60 ml of a resin resulting from bonding of 44 mole% (based on the constituent glucosamine) of (N-3-cyclohexylpropionyl-beta-alanyl)-beta-alanine to Chitopearl BCW1010, and 200 units of CGTase obtained from *Bacillus ohbensis* were added, and the mixture was maintained at a pH of 7.0 and a temperature of 50° C. for 19 hours with gentle stirring to form CD. After the reaction, the resin was separated by filtration, washed with 100 ml of water, and eluted with 500 ml of a 50% (V/V) aqueous solution of ethanol to separate CD. The amount of CD formed was determined by subjecting the supernatant, the washings, and the eluate to liquid chromatography. The results are shown in Table 13.

As a control, the above CD-forming reaction was carried out without adding the adsorbent resin.

TABLE 13

| | Amount of CD formed (g) | |
| --- | --- | --- |
| | Resin added | Resin not added (control) |
| α-CD | 0 | 0.01 |
| β-CD | 2.84 | 0.94 |
| γ-CD | 0 | 0.23 |
| Total | 2.84 | 1.18 |
| Conversion (% based on substrate) | 56.8 | 23.6 |

EXAMPLE 17

Two hundred units of CGTase was added to 50 ml of the same substrate solution (concentration 10% (W/W)) obtained by liquefaction under the same conditions as in Example 16, and the reaction was carried out at 50° C. for 1.5 hours. Then, while the reaction was continued at 50° C., the reaction mixture was passed through a column (diameter 3 cm) packed with 42 ml of a resin obtained by bonding 44 mole% (based on the constituent glucosamine) of (N-3-cyclohexylpropionyl-beta-alanyl)-beta-alanine to Chitopearl BCW1010 and circulated bvetween the reactor and the column for 18 hours (flow rate 1.5 ml/min.). After the reaction, the resin was washed with 80 ml of water, and eluted with 350 ml of a 50% (V/V) aqueous solution of ethanol to separate CD. The amount of CD formed was determined as in Example 16.

As a control, the above reaction was carried out without packing the resin in the column.

The results are shown in Table 14.

TABLE 14

| | Amount of CD formed (g) | |
| --- | --- | --- |
| | Resin added | Resin not added (control) |
| α-CD | 0 | 0.01 |
| β-CD | 2.15 | 0.86 |
| γ-CD | 0 | 0.18 |
| Total | 2.15 | 1.05 |
| Conversion (% based on substrate) | 43 | 21 |

What is claimed is:

1. A cyclodextrin adsorbing material composed of a water-insoluble resin substrate to which a ligand having such a size as to be included by cyclodextrin is chemically bonded via a spacer radical, said size of the ligand being such that when the shape of the ligand is taken as an ellipse just surrounding the entire atomic grouping of the ligand, the short diameter of the ellipse is within the range of about 4 to about 10 angstroms.

2. The adsorbing material of claim 1 wherein the ligand is selected from $C_3$–$C_7$ branched aliphatic hydrocarbon groups, $C_5$–$C_{34}$ alicyclic hydrocarbon groups, aromatic hydrocarbon groups and heterocyclic groups.

3. The adsorbing material of claim 1 wherein the ligand is selected from t-butyl, cyclohexyl, adamantyl, norbonenyl, a glycyrrhetinic acid residue, an abietic acid residue and p-t-butylphenyl.

4. The adsorbing material of claim 1 wherein the water-insoluble resin substrate is selected from polysaccharide compounds, derivatives thereof, styrene resins, polyacrylamide resins and peptides.

5. The adsorbing material of claim 1 wherein the water-insoluble resin substrate is a polysaccharide compound or its derivative.

6. The adsorbing material of claim 1 wherein the water-insoluble resin substrate is chitosan or its crosslinked product.

7. The adsorbing material of claim 1 wherein the total length of the spacer radical and the ligand is at least 100,000 angstrom.

8. The adsorbing material of claim 1 wherein the total length of the spacer radical and the ligand is within the range of 10 to 60 angstrom.

9. The adsorbing material of claim 1 in which is in the form of beads.

* * * * *